United States Patent
Stack

[19]

[11] Patent Number: 5,815,717
[45] Date of Patent: Sep. 29, 1998

[54] APPLICATION PROGRAM AND DOCUMENTATION GENERATOR SYSTEM AND METHOD

[75] Inventor: Brian T. Stack, Miami Lakes, Fla.

[73] Assignee: Authorgenics, Inc., Miami Lakes, Fla.

[21] Appl. No.: 549,633

[22] Filed: Oct. 27, 1995

[51] Int. Cl.⁶ .................................................. G06F 9/45
[52] U.S. Cl. .......................................................... 395/705
[58] Field of Search ................................ 395/50, 51, 60, 395/1, 64, 75, 76, 701, 702, 703, 705, 706, 500

[56] References Cited

U.S. PATENT DOCUMENTS

| | | | |
|---|---|---|---|
| 4,860,204 | 8/1989 | Gendron et al. | 395/702 |
| 4,884,217 | 11/1989 | Skeirik et al. | 364/513 |
| 4,891,766 | 1/1990 | Derr et al. | 364/513 |
| 4,949,253 | 8/1990 | Chigira et al. | 395/500 |
| 5,038,296 | 8/1991 | Sano | 395/51 |
| 5,043,891 | 8/1991 | Goldstein et al. | 364/419 |
| 5,084,813 | 1/1992 | Ono | 395/703 |
| 5,101,491 | 3/1992 | Katzeff | 395/500 |
| 5,159,687 | 10/1992 | Richburg | 395/702 |
| 5,204,939 | 4/1993 | Yamazaki et al. | 395/51 |
| 5,210,837 | 5/1993 | Wiecek | 395/375 |
| 5,261,103 | 11/1993 | Takeuchi et al. | 395/705 |
| 5,263,123 | 11/1993 | Hayashi | 395/51 |
| 5,276,776 | 1/1994 | Grady et al. | 395/64 |
| 5,301,258 | 4/1994 | Hayashi | 395/52 |
| 5,303,331 | 4/1994 | Namba | 375/51 |
| 5,309,355 | 5/1994 | Lockwood | 364/401 |
| 5,315,710 | 5/1994 | Kishimoto et al. | 395/700 |
| 5,353,371 | 10/1994 | Honiden et al. | 395/1 |
| 5,355,444 | 10/1994 | Chirico | 395/51 |
| 5,367,619 | 11/1994 | Dipaolo et al. | 395/149 |
| 5,408,587 | 4/1995 | Maier et al. | 395/51 |
| 5,408,667 | 4/1995 | Brodie et al. | 395/700 |
| 5,414,798 | 5/1995 | Nigawara et al. | 395/75 |
| 5,418,889 | 5/1995 | Ito | 395/75 |
| 5,434,952 | 7/1995 | Yen et al. | 395/50 |
| 5,442,792 | 8/1995 | Chun | 395/706 |
| 5,450,545 | 9/1995 | Martin et al. | 395/701 |
| 5,526,522 | 6/1996 | Takeuchi | 395/702 |
| 5,530,861 | 6/1996 | Diamant et al. | 395/650 |

*Primary Examiner*—Emanuel Todd Voeltz
*Assistant Examiner*—Peter J. Corcoran, III
*Attorney, Agent, or Firm*—Fliesler, Dubb, Meyer & Lovejoy LLP

[57] ABSTRACT

Automatic generation of an application program is performed by a programmed system including a guided editor for establishing program, data and field definitions from input event elements. A sequence generator, coupled to the guided editor, autonomously processes the program, data and field definitions into descriptive atomic sequences, each describing a unique characteristic such that a plurality of frames describes the input event elements. A rule processor, including a program rule base describing the structure and operation of an application program, autonomously processes the program rule base with the descriptive atomic sequences unifying the descriptive atomic sequences with the structure and operation of the application program. A syntax processor, including a language syntax rule base, autonomously unifies the descriptive atomic sequences with the language syntax to provide a coded representation of the application program.

11 Claims, 5 Drawing Sheets

APPLICATION PROGRAM AND DOCUMENTATION GENERATOR SYSTEM AND METHOD

BACKGROUND OF THE INVENTION

1. Field of the Invention

The present invention is generally related to an automated program and documentation generating system and, in particular, to a multi-stage, rule based system for managing the concurrent development of a program and documentation specifications that are then processed into program code and directly corresponding user documentation.

2. Description of the Related Art

Automatic program generation, referred to variously as the product of program synthesizers, application generators and self generating systems, are particularly desirable as the complexity of application programs increase concurrent with an ever growing desire for different and distinct functionality at all levels of an application's operation. The ability to design, implement, maintain and document an application with broad and highly configurable functionality diminishes as the comprehensiveness of the application increases. Furthermore, training and documentation must deal with the manifold options that such applications include.

In order to alleviate the presence of unnecessary complexities and configuration options, yet avoiding the necessity of completely redesigning, implementing, maintaining and documenting dedicated application programs, a variety of program generators have been proposed. Perhaps the most common form of program generators are the form and report generator shells commonly used with or provided as part of database management systems. These systems permit reasonably complete screen and report layout definition through the identification of field locations, data types and formatting, and relations to data stored in an underlying, predefined database management system. An operative program is generated that allows user data exchange through forms and data output through reports based on a defined correspondence between form, report and database fields. The concept of a data dictionary has been introduced to, in part, support internal documentation of the relational correspondence between the defined database fields and the form and report fields. Such systems typically provide little additional support of application design, little if any support of functional logic to process data transported to or from the database, and essentially no automatic documentation of the programs generated.

In order to support a greater degree of internal functional capabilities, program synthesizers based on libraries of pre-established program parts have been proposed. A library based program synthesizer is described in U.S. Pat. No. 4,949,253. The described program generator operates from defined data to select a best match of a program part prototype from a part prototype library. Each program part prototype stored by the library is predefined and statically maintained as part of the library until selection during program generation. Upon selection, the program part prototype is processed through macro substitution to merge the interface to the part prototype with, presumably, a previously processed part prototype and, further, to unify the variable names utilized by the part prototype with those of the previously processed part prototype.

In functional terms, however, the capabilities of each part prototype is essentially fixed upon initial establishment within the part prototype library. The patent does not describe how part prototypes are selected based on function as opposed to available interface definitions. In the absence of such selectability, the functionality of the various part prototypes must be narrowly defined as against the particular function of the overall program to be generated to insure that the inherently realized logic of the program follows from the definition of the part prototype interfaces.

Another program synthesizing system is described in U.S. Pat. No. 5,315,710. This system again operates from a library termed by the patent as a program components data base. The system provides for an increased degree of freedom in interfacing program components for the automatic generation of mediating program parts that are tailored to specifically couple otherwise disparately defined program components. Thus, where two seemingly incompatible interfaces of program components must be joined, a program transformation rule base is consulted for a computative rule that can be utilized to convert the unit, base or type of data to another such representation. A data type transformation rule may be utilized to convert the data type of data from one type to another. By combination of these transformations for each of the variables through which data is passed between program components, a mediating program is assembled. The two interfaces of such a mediating program are inherently defined by the interfaces of the program components to be joined. Thus, the program components and mediating program can be assembled into a larger functional unit as part of or to complete a larger application program. However, the generated mediating program is inherently limited in its ability to alter the operational function of the program components. Consequently, the available selection of program components must be well predefined and highly consistent with the ultimately intended functionality of the application program generated.

An automatic program synthesizer system of greater functionality is described in U.S. Pat. No. 5,038,296. In this system, a system specification and set of program synthesis rules functionally define a target program through the description of operations to be performed on data represented by variables. The system specification and program synthesis rules identify these variables through functional definitions. The program synthesizer processes these definitions to resolve functionally described variables to specific variable names. Existing variables are identified by their assigned functional attributes. Where a variable has yet to have been defined for a specific set of attributes, an interpolation program is generated to define the necessary variable with the required attributes. Since the interpolation program is apparently generated by the same program generating means utilized to created the target program, the interpolation program apparently operates to combine, as necessary and appropriate, other pre-existing variables to obtain the variable value that is to be functionally stored by the newly created variable. That is, the function of the program generating means is to couple specific operations to essentially singular variables. Consequently, the functional outline of the target program provided by the system specification with functional sub-steps being defined by program synthesis rules can reasonably define a complete target program.

The program synthesizer described in U.S. Pat. No. 5,038,296, however, appears to inherently require a very close concordance between the system specification and the pre-existing program synthesis rules in order to generate a target program. The disclosed system provides no identifiable method or mechanism for creating or maintaining such a concordance or insuring valid use during the operation of the program synthesizer. Furthermore, the disclosed system fails to identify any mechanism for supporting the development of the system specification and certainly fails to disclose any mechanism for generating documentation appropriate for the target program specifically produced.

In order to increase the available performance of program generators, various forms of expert systems have been incorporated. Such expert systems include finite state automata, forward and backward chaining rule based inference engines, fuzzy logic inference systems and context sensitive or guided editor systems. Although the use of such expert systems can greatly increase the apparent functionality of a program generator system, such expert systems have typically been applied in an application processing environment that, based on predefined rules, limits the perceived complexity of the operative system to the particular data input and requests made of the expert system. As such, these expert systems present an environment within which an application appears to have been constructed. Compilable or interpretable application program code is not generated. Consequently, such environments are difficult to design and maintain and make little provision for the production of documentation that is specific to a particular working application program.

Expert systems have also been utilized as components in more conventional program generators. However, in most instances, the expert systems are functionally limited to more completely or expansively enabling the selection of program part prototypes for use in the construction of the application program or inferring suitable mediation transformations necessary to interface program components. As a result, the prior art utilization of expert systems in program generator systems has not previously enabled the development of a comprehensive application program generator.

SUMMARY OF THE INVENTION

Thus, a general purpose of the present invention is to provide for the comprehensive design, generation maintenance and documentation of independent, functionally targeted application programs.

This is achieved in the present invention by a programmed system that provides for the automatic generation of an application program. The programmed system includes a guided image editor for establishing program, data and field definitions from a plurality of input event elements. A sequence generator, coupled to the guided editor, autonomously processes the program, data and field definitions into a plurality of functionally descriptive atomic sequences, each describing a unique characteristic such that a plurality of frames, each including zero or more functionally descriptive atomic sequence from each of the functionally descriptive sequences, respectfully describes the plurality of input event elements. A rule processor, including a program rule base conditionally describing the structure and operation of a predetermined application program, autonomously processes the program rule base in concert with the plurality of functionally descriptive atomic sequences proceeding generally sequentially over the plurality of frames conditionally unifying the plurality of functionally descriptive atomic sequences with the structure and operation of the predetermined application program. A syntax processor, including a syntax rule base defining the syntax of a predetermined programming language, then autonomously unifies the plurality of functionally descriptive atomic sequences with the syntax of said predetermined programming language to provide a coded representation of the structure and operation of the predetermined application program consistent with the syntax of the predetermined programming language.

An advantage of the present invention is that a set of sequences describing input event elements is gathered by the guided image editor. Provided that the input event elements reasonably correspond to the anticipated function of the predetermined application program, the rule generator provides for autonomously unifying the sequences with the program rules by conditionally utilizing the contents of the sequences to automatically generate an application program substantially defined by the input event elements and consistent with the program rules.

Another advantage of the present invention is that the syntax generator provides for the autonomous generation of compilable or interpretable code fully consistent with the definition of a predetermined programming language.

A further advantage of the present invention is that the guided image editor provides for objectifying a series or grouping of one or more input event elements. The resulting objects can be cut, copied and stored away for future use. Since an image, rather than a mere reference is captured by the object, complete inheritance characteristics are not provided. Rather, internal references are maintained within the image and used subject to consistency rules upon pasting of the object into another object or larger image. Thus, reuse coupled with the capability for independent modification is provided.

Yet another advantage of the present invention is that the guided image editor provides for the documentation of the existence, purpose and operation of the input event elements substantially coincident with their input. Documentation is received generally on a per event basis as text input in response to guiding questions or prompts. Subsequently, all aspects of the event desired sequences can be accessed by the rule generator in concert with the help text to provide highly characterizing documentation that closely follows the structure and appearance of the generated application program. The generated documentation can include textural descriptions generated in correspondence with the processing and limiting logic defined functionally in connection with the input events. The generated documentation is further processed to include library text and constructed tables, including tables of contents and figures.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
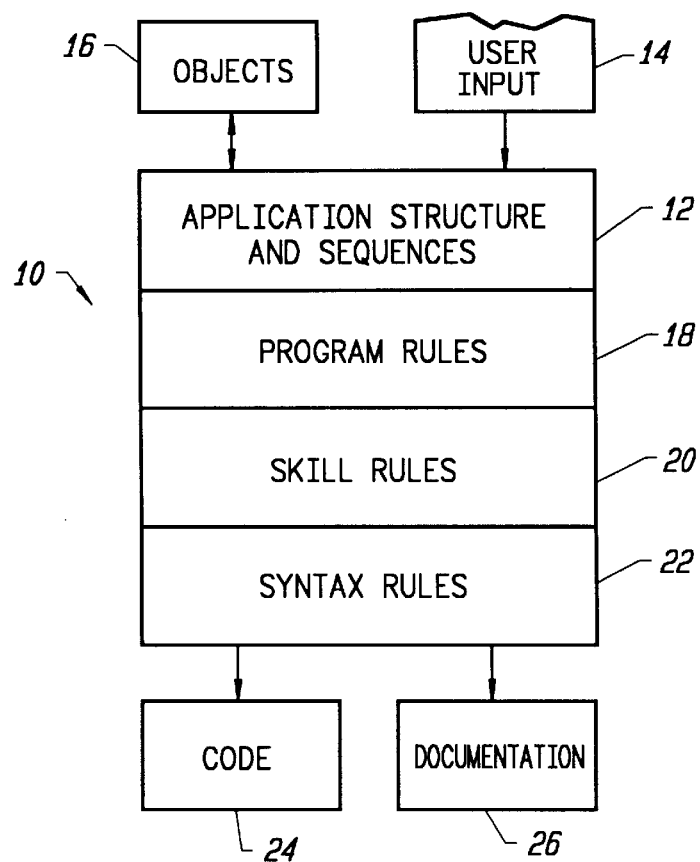
FIG. 1 provides a general organization of the knowledge structure of the present invention.

A system that provides for the substantially comprehensive and automatic generation of any number of application programs is generally shown in FIG. 1. The application generator system 10 is preferably executed within a conventional general purpose computer system (not shown) and within a conventional operating system environment such as provided by Microsoft Windows 3.1 and supporting a conventional programming language, such as BBX Business Basic available from Basis International, Microsoft C available from Microsoft, Inc. and C++ available from International Business Machines, Corp. Within this environment, the system 10 operates to acquire and construct the application structure and sequences 12 that correspond to a particular application program through the application of user input 14 optionally in combination with the utilization of sequence specifying objects 16. The user input 14 may be direct programmer data entry, system specifications authored by a skilled end user, or the product of computer aided analysis of other programs and specifications that, in combination with a user's qualifying direction, produce the equivalent of direct user input.

The objects 16 are, in accordance with the preferred embodiment of the present invention, high level arbitrarily formed components of the user input 14. As such, the objects 16 are not directly program parts but, rather, are partial detailed specifications encapsulated into objects that may be cut, clipped, stored, replicated and moved within the process of providing user input 14 during the creation of the application structures and sequences 12.

As the application structures and sequences are created or subsequently modified, the resulting structures and sequences are parsed through a substantially hierarchical expert system that successively applies program rules 18, skill rules 20 and syntax rules 22 that culminate in the generation of a discrete module or set of modules of compilable or interpretable code 24, independent documentation, or both code 24 and corresponding documentation 26. The program rules 18 are provided in a rule base organized to provide a set of common rules and discrete sets of rules specific to particular program types. Although program types may be arbitrarily defined consistent with the present invention, the presently preferred set of program types include data collection, data processing, and data output program types. Additional program types, such as one providing for the definition of an expert system that can be used separately or in support of the other program types can also be defined. Further, program sub-types may be associated as detailed categorizations of the program rules 18. Consistent with a preferred embodiment of the present invention that is oriented toward accounting or accounting type application generation, the program sub-types preferably include maintenance, transactional, and detailed analysis screens subordinate to the data collection program type, a posting process subordinate to the processing program type and columnar report, inquiry report, and form reports subordinate to the output program type. Thus, as the program rules 18 are applied to the application structure and sequences 12, appropriate sets and sub-sets of the program rules are data dependently identified and executed toward the realization of the application program specifically corresponding to the particular application structure and sequences 12 to which the program rules 18 are applied. Consequently, the present invention provides most directly for the presence and utilization of potentially conflicting program rules that may appropriately exist in support of different types and sub-types of application programs. Since some rules are not associated with any particular program type or sub-type, some of the program rules 18 are generically and therefore efficiently defined for use in generation of all types of application programs.

The skill rules 20 represent the low-level functional operations that are utilized to effectively implement the application of the program rules. That is, the skill rules provide basic functional operations that are widely used in the generation of an intermediate representation of a generated program. Although any number of skill rules 20 may be defined for use within the system 10, the present implementation provides for eight basic skills including:

1) Single Line: directs the processing of a rule through substitution or interpretation to establish an intermediate or final code representation of a constant or variable element in a one-to-one relationship of rule to output line (Example: a rule uses this skill to instantiate the rule as a line of code;

2) Recurring Line: directs the processing of a rule through substitution or interpretation to generate a series of nearly identical intermediate or final code representations of a constant, or more typically, a variable element (Example: a rule uses this skill to generate code providing for an array of detail lines in a header detail relationship);

3) Variable List: directs the processing of one or more rules referencing variable elements that may be used in different contexts (such as numeric verses string) and generates a corresponding single intermediate or final code representation of the rules (Example: rules establish multiple variables that are initialized to either numeric or string defaults based on the type of a switch variable and organized into a final code representation of a "case" programming statement);

4) Recurring List: directs the processing of one or more rules consistent with the application of a Recurring Line skill to a Variable List skill (Example: provides for generation of separate case statements for each row of a detail array, thereby providing for independent processing of the detail rows);

5) Implied List: directs the generation of a list of constant values to be used in a variable element (Example: generation of program subroutine name references in the construction of a jump table);

6) Translate: directs a sequence search to select one or more sequences related based on a defined constant or variable (Example: search sequences to find the sequence specifying a screen field location of a field referenced by the functional logic of a feature packet referenced by a current sequence);

7) Combined List: directs the evaluation of one or more rules to select and process each of one or more related sequences based on sequence type, such as alpha verses numeric, based on an examination of a set of sequences for given relationships (Example: first declaring and then establishing the value of a system variable based on the content of other system variables further constrained by whether such other variables are in use in a relevant context); and 8) Mixed List: directs the selection of one or more sequences to be used in establishing a variable element based on any coincidental relationships that can be identified through examination of a qualified set of sequences (Example: determine a best match join of fields declared as part of two or more file records to develop a key for ordering the return of data from a file).

The program rules 18 may exist in the program rule base in a seemingly arbitrary order. However, the program rules 18 may be considered to be ordered when viewed as applicable to a particular program type and sub-type. Thus, for a particular program sub-type, program rules will appear to be ordered in an evaluation sequence that, upon application to the application structure and sequences 12, will provide for the realization of a corresponding application program sub-type. The processing of program rules 18 begins at a logical root rule and proceeds through the ordered set of rules that are either generic to all program types or specific to the sub-program type presently being evaluated. As the program rules 18 are being evaluated against the application structure and sequences 12, the skill rules 20 are executed to develop a logically complete representation of the application program to be realized through the generation of the code 24. That is, the skill rules provide for the instantiation of the logical statements that, when further evaluated against the syntax rules 22, provide for the generation of the code 24. Since each logical statement of an application program can be fully represented as a constant or variable element, represented either in numerical or ASCII form, or list structures of such elements, even the limited set of eight basic skills is sufficient to support a full and functionally complete set of program rules 18 necessary to generate most, if not all, accounting or accounting related applications. The eight basic skill rules are also quite sufficient to generically support generation of many other types of applications as well. Should either different functionality be desired or required for a particular application or a higher level program rule be desired to be supported through the construction of a complex skill, such skills may be readily added to the skill rule base 20.

In the preferred embodiment of the present invention, the intermediate representation of the application program is only transiently developed. As each statement representation is generated, syntax rules from the syntax rule base 22 are applied to realize and output the code 24 to a persistent file stored preferably on a non-volatile storage medium.

The syntax rules 22 are maintained in the syntax rule base as largely an ordered series of rule statements. Division among the syntax rules within the syntax rule base may be defined by a language type code attached to each rule. Different language codes may be defined for variants of the same general type of language such as Business Basic and Visual Basic or for significantly different languages, such as C. Where the languages are substantially similar, a common intermediate representation of the application program is adequate for generating the code 24 specific to either particular language. Where the language of the code 24 is significantly different, slight changes in the paradigm implemented by the intermediate representation of the code 24 may be necessary. If this is the case, the program rules and skill rules 18, 20 may be made appropriately sensitive to the particular language chosen for the code 24 so as to suitably alter the intermediate representation of the application program as needed for closure in applying the syntax rules 22 for that language to realize the code 24 in its entirety.

Subject to the selection of the appropriate programming language, the application of the syntax rules to the intermediate representation of the application program proceeds on a logically statement by statement correlated basis. Each logically complete statement of the intermediate representation of the application program is utilized to select one or more corresponding syntax rules 22. The syntax rules 22, like the program rules 18, utilize the skill rules 20 to actually perform the operations necessary to realize the output of potentially one or more language specific statements to the code file 24 for each logical statement of the intermediate representation of the application program. Thus, the syntax rules 22, like the program rules 18, are well supported by even a small set of skill rules. Syntax rules 22 that specify higher level functions or require different operations in the generation of the code 24 may be readily supported by augmenting the skill rules 20 with different or more complex skill rules.

Although the foregoing description of the system 10 has largely been in relationship to the generation of code 24, the system 10 equally produces documentation 26 that is highly correlated to the specifics of the code 24 as generated by the system 10. The user input 14 and objects 16 both may contain and represent descriptive comments that are ultimately embodied in the code 24 and descriptive text that describes entire programs, sub-programs, individual screens and report, and particular fields that are a part thereof as the documentation 26. Thus, these code comments and descriptive text are embodied as or correlated to sequences within the application structure and sequences layer 12 and subjected to evaluation by program, skill and syntax rules 18, 20, 22 generally as the sequences are evaluated. The code comments are thus effectively compiled into the code 24. The descriptive text is similarly compiled into the documentation file 26 that is persistently stored preferably on a non-volatile storage medium.

Since the application structure and sequences 12 are also stored in a persistent file, preferably on a non-volatile storage medium, the system 10 permits ongoing maintenance, modification and derivation of the stored application structure and sequences 12. Consequently, the application generation system 10 provides for the comprehensive design, implementation, maintenance and documentation of a substantially automatically generated application program.

Figure 2:
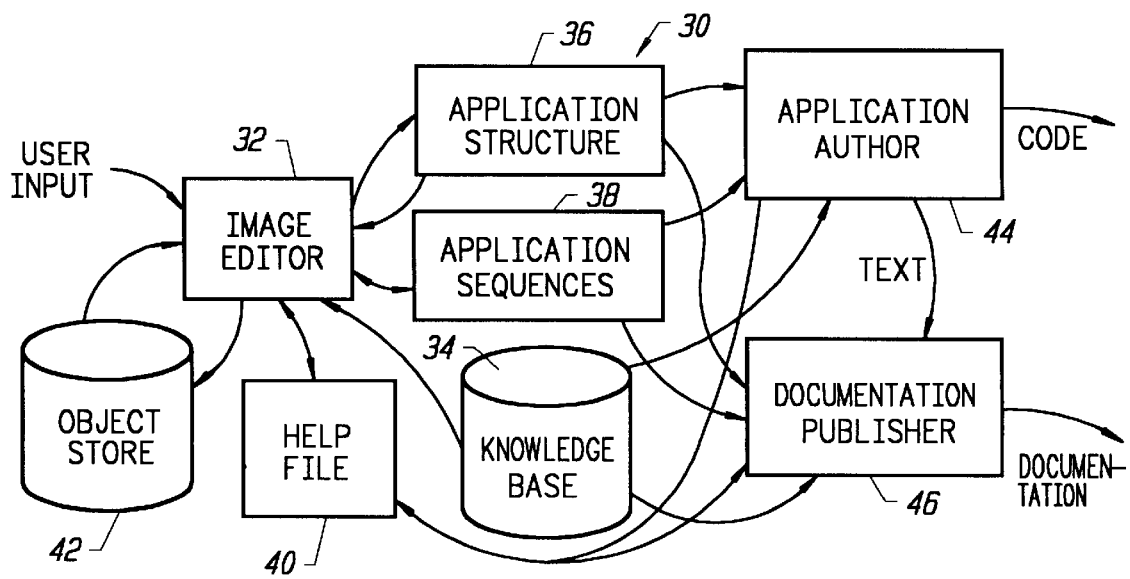
FIG. 2 provides a diagram of the preferred relational architecture of the various components of the present invention.

The preferred architecture 30 of an application generator constructed in accordance with the preferred embodiment of the present invention is shown in FIG. 2. An image editor 32 that combines features of a prompting guided editor facility as well as a context sensitive editor in combination with a full screen imaging editor, provides the primary environment for acquiring user input. The preferred image editor 32 presents as an 80×25 cell viewport on a 999×999 cell image page. The display image presented to a user for use in input can be a combination of viewport sections from different parts of the image page. In addition, effectively off screen portions of the image page can be utilized as scratch areas utilized in support of processes that realize on screen viewable information.

The image editor 32 is utilized to design and define an application structure 36 constructed as a hierarchical relationship between a topic, identifying a particular application program, corresponding programs that together implement the application program, and sequences that, together, define specific programs. The hierarchical relationship serves to establish the application structure 36 in a definite and easily referencable form. Furthermore, each topic, program and segment is uniquely identified by a reference name stored as part of application structure 36.

The application structure 36 also maintains a hierarchical relationship of files and file records utilized in connection with a particular topic. Each of the files and file records in the application structure 36 store reference names that are hierarchically unique for each file and record.

The reference names stored within the application structure 36 provide not only a convenient way of designing and defining the application structure 36, but also uniquely defined reference handles for utilization by the image editor in establishing relationships that will serve as the basis for the generation of application sequences 38.

The guided editor and context sensitive editor features of the image editor 32 are preferably driven by an expert system operating from a knowledge base 34. The expert system supporting the image editor 32 integrates a documentation function with the functions of designing and defining the application structure 36 and the generation of application sequences 38. This expert system draws, from a static file associated with and effectively part of the help file 40, prompting questions and starting text. The prompting questions are context specific to the user input and the starting text is context specific to the prompting questions. Different prompting questions are retrieved from the help file 40 by the image editor 32 as topics, programs, sequences, files and records are defined. Additionally, prompting questions are selected by the image editor correlated to each field or display data defined for individual segments of programs based on program types and sub-types. In each instance, corresponding starting text that anticipates and suggests the form and nature of the user input answer is provided.

In general, the prompting questions take two basic forms. The first form is a request for introductory information that might be utilized to explain the functional relationship of a segment to a program or a program to a topic or of a process to be carried out by a segment or program. The second form is utilized to elicit information describing a specific field or display area or processing choice presented to an end user. These prompting questions are selected from the help file 40 based on the current context of the user operation of the image editor 32 and thus serve to guide the further use of the image editor 32 including specifically the acquisition of documentation information. The user input responses to the prompting questions are stored back into the help file 40 in a manner keyed to the original prompting questions and the specific portion of the application structure 36 for which the prompting questions were generated.

The image editor 32 also provides for image manipulation functions, including clipping, cutting, pasting and selecting sections of the image page. These manipulation operations permit image portions to be moved, replicated, and deleted. Based on user input, these operations are implemented with the appearance of a conventional block operation. However, the image editor 32 provides, as part of block operation, for the hidden selection of the attributes associated with each of the display items and fields within the blocked portion of the image. The various block object operations are preferably implemented subject to the evaluation of block operation rules retrieved from the knowledge base 34. These rules aid in the reasonable selection of the attributes associated with a blocked object and their merger with existing attributes when an object is copied back into an image. As such, the block operation also provides for consistency check and merge validation in the execution of the image editor 32.

Block portions of the image may also be copied to an object store database 42 and stored subject to retrieval upon reference to a uniquely assigned object identifier. Since the image editor 32 preferably associates attribute identifiers with each display item or field rather than just references to an attribute, objects stored to the object store database 42 are logically self-contained and do not inherit subsequent changes made through the image editor 32 to any original or other copy of the object. Consequently, the objects stored by the object store database 42 are essentially static, though the objects may be dynamically selected with arbitrary size and complexity.

As display items and field data are input into the image editor 32 and attributes are assigned, the image editor 32 derives and provides definitional information to an application sequence generator that produces a set of application sequences that comprehensively describe a program segment as well as identify the database program and the display item or field, the location of the item or field within the space of the image page, and each of the functional attributes associated with the item or field. These application sequences are then provided to the application sequences stacks 38.

Once the application structure 36 and application sequences 38 for a program have been constructed through the operation of the image editor 32, an application author 44 is invoked to generate a corresponding set of compilable or interpretable code. The application author operates from the application structure 36, application sequences 38, the contents of the help file 40 and a corresponding set of programs, skill and syntax rules as stored by the knowledge base 34. The application author 44, operating generally as an expert system, applies program, skill and syntax rules to the available definition of the application structure 36 in concert with the specific application sequences 38 to produce the code for a program of the particular type and sub-type being generated. That is, a program of the selected program type and sub-type is constructed by the operation of the expert system of the author 44 based on the defined application structure 36 and available applications sequences 38. In accordance with the present invention, the code produced by the author 44 is the product of the program rules that define a particular program type and sub-type to the extent that such rules are consistent with the provided application structure 36 and application sequences 38. Since the code statements are effectively independently generated by the operation of the author 44 based on the application structure and sequences 36, 38 the individual code statements are inherently unified with respect to the number, naming and typing of all variables instantiated by the author 44. No further unification of variables or mediation of the interfaces between segments of a single program is required. Interfaces between segments, to the extent that they are required, are automatically matched by the operation of the expert system of the author 44 based on the definition of the application structure 36 and the application sequences that define data items and fields that are shared by different segments of a common program.

Finally, a documentation publisher 46 effectively operates in parallel with the application author 44. The expert system implementing the documentation publisher 46 operates based on the application structure and sequences 36, 38 and rules and information provided from the knowledge base 34 and help file 40. In the preferred embodiment of the present invention, the publisher expert system 46 is simplified by relying upon the application author 44 to first effectively process the application sequences 38 to particularly provide detailed help text describing process elements implemented by the functional logic defined by the sequences. For example, the help text for a field defined as a three digit positive number might be: "The value of the Accounting Period field cannot exceed 999, but may be as small as 0." Consequently, the detailed help file text is generated by the application author 44 on behalf of the documentation publisher 46. This information thus closely represents the particular code generated by the application author and alleviates the requirement of the documentation publisher 46 might otherwise have to completely reconstruct the code through reparsing the application structure and sequences 36, 38. Alternately, the expert system underlying the documentation publisher 46 could be merged with the application author 44 so that fully formed documentation is directly generated by the author 44. Equivalently, the documentation publisher 46 may duplicate the expert system of the author 44 and operate directly from the information sources utilized by the author 44. In any event, the documentation publisher 46 operates on the information provided to the publisher 46 to generate text documents that correspond closely to the code produced by the application author 44. In particular, this includes a merge of the explanatory text entered into the help file 40, the screens, processes, and report formats designated by the operation of the publisher 46 itself, the structure and menu organization of the documented program as determined from the application structure 36 including any definitions and explanations processed by the publisher 46 based on documentation structure definition rules obtained from the knowledge base 34.

Figure 3:
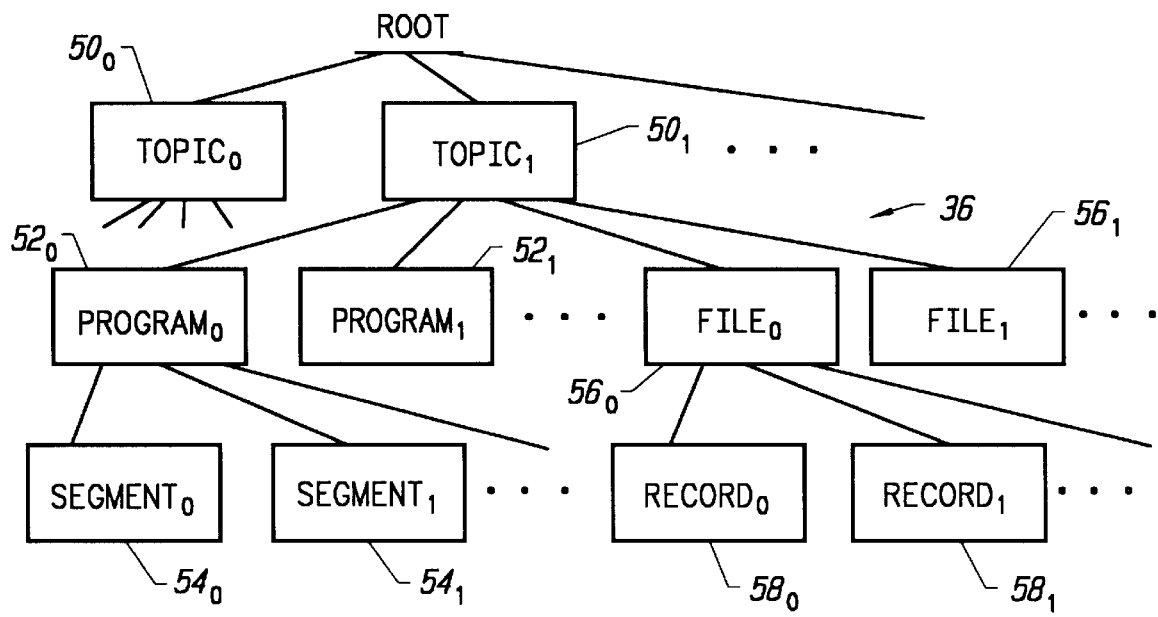
FIG. 3 provides a simplified diagram of the application structure maintained by the present invention.

The application structure 36 maintained by the application generator 30 is illustrated in FIG. 3. The application structure 36 is organized as a hierarchy depending from a logical root node. The instantiated structure 36 consists of any number of topic records 50 representing specific application programs, such as an accounts payable application, a charitable gift donor tracking application, or a critical path construction management application. Each topic record 50 includes a topic identifier, typically a descriptive name of the application program, a menu structure used to organize application program menu entries in a hierarchy of one or more screen oriented menu forms, and a program list that is used to identify each component program provided to realize as a cumulative whole the particular application program identified by the topic. Another list structure associated with each topic collects file identifiers as references to each file operated on or from by a particular topic 50.

Thus, a particular topic $50_1$ associates a topic identifier, $Topic_1$, a menu list structure (not shown) and program and file lists diagrammatically shown as logical connections to one or more programs 52 and files 56. Each of the program records 52, for example specifically program $52_0$, includes a program identifier, $Program_0$, a program type and, as a program level sequence, a sub-type identifier and a list structure that identifies the set of program segments that in turn, together, define the function of the program $52_0$.

In the preferred embodiment of the present invention, the programs 52 are partitioned into relatively discrete functional operations. For example, within an accounts payable topic, a particular program 52 may isolate and perform the function of receiving and storing input defining an invoice. Another program 52 may be defined as responsible for posting invoice records to general ledger accounts. Another program may be specified to select and print a reconciliation report. Thus, the logical partitioning of the programs 52 can be discretely identified by program type and sub-type thereby supporting the operation of the expert system underlying the author 44 in generating the corresponding program code. Further, additional program types and sub-types may be readily added or defined and the set of program rules modified or extended to appropriately support new program types and sub-types.

Each program, such as $Program_0$ $52_0$ is effectively implemented as a set of one or more segments 54. A segment record, such as segment record $54_1$ logically identifies a set of application sequences that functionally define a sub-program function of the program $52_0$. In the preferred embodiment of the present invention, up to 99 segments can be associated with a particular program $52_0$. The arbitrary limit of 99 segments is believed to be more than adequate to permit definition of sufficient segments, each practically preferred to be of limited complexity, to implement the function of any particular program 52. Thus, a segment 54 may represent an isolated data entry screen and associated input field data validation logic. A subset of segments 54 may be utilized to implement a more involved process where separate segments are utilized to implement, for example, a report selection screen, a report data qualification input screen and report generation.

Each of the segment records 54 store a segment identifier that is logically repeated, either explicitly or implicitly in each of the application sequences associated with a particular segment 54. These application sequences 38, in turn, provide the detailed logic utilized by the application generator 30 in the process of generating code and documentation.

The file records 56 each include a file ID that can be referenced in an application sequence to specify an access of the file corresponding to the file record. The type of a file, file name and location are also stored as part of the file records 56. The file type information specifies, in effect, the access methods for a specific file. File types may include relational database file, flat file, temporary data file, or in-memory data structure. The file name may be either a relative or absolute path name to a filesystem file or, in the case of relational database, the name of the database and table that is to be referenced by this file record 56. The file location information may be provided to support distributed file references or structured indirections in the location of files within a specific filesystem. In addition, the preferred embodiment includes a data dictionary that stores information that describes the file and data structures, including field size and types, and contains maintainable location information.

Each file record 56, such as $File_0$ and $56_0$, includes a list logically identifying a set of one or more field (or record) records 58. These records 58 each store a record identifier that can be referenced by an application sequence as a unique name within a name space comprehensive to the file data space utilized by a particular topic. Each of the records 58 may be hierarchically referenced by a root record sequence that stores field record size and type information for each field represented by the particular record. The field size information typically represents the maximum storage space available or referenceable by a particular field. The field type information specifies a data type that is dependant on the record type. Thus, for example in the case of the flat file, the record type may be ASCII, integer or binary. In the case of a database table field, the field type may specify any of the predefined database types, including date, money, text, integer and float.

Figure 4:
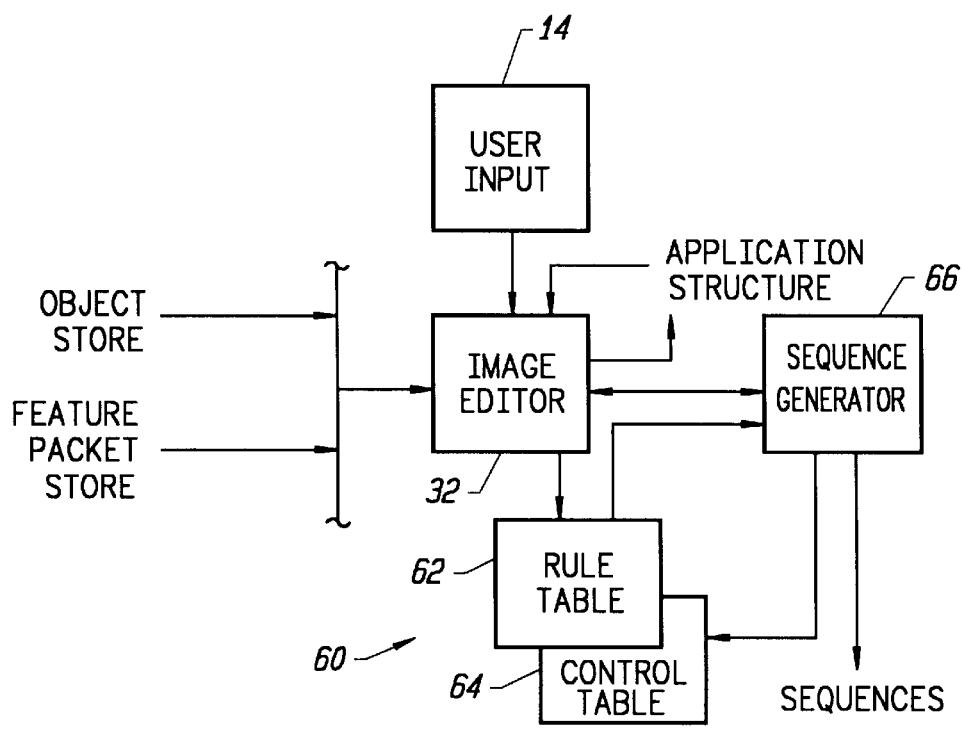
FIG. 4 provides a diagram of the image editor and related sub-systems utilized to generate application sequences in accordance with the present invention.

FIG. 4 provides a more detailed diagram of the architecture 60 closely associated with the image editor 32 of the application generator 30. The image editor architecture 60 operates to merge user input 14 with objects stored in the object store 42 and feature packets stored as part of the knowledge base 34. The image editor 32 performs this function based in part upon application structure information and validation information obtained from a rule table 62. Based on these inputs, the image editor produces a sequence of image definitions that are provided to a sequence generator 66.

The user input 14 to the image editor 32 permits a user to directly input image information that, in the case of a screen oriented form for example, specifies background data identifying the location and intended content of screen fields. The user input 14 is also utilized for performing conventional editor functions that, in particular, include the storage and retrieval of image sections as objects to the object store 42. Retrieved objects can be pasted onto the image page maintained by the image editor.

In addition, user input 14 may specify attributes to be applied to data fields identified on the image page. These attributes may be directed to the operative process to be implemented by a program 52 currently being edited within the image editor 32 or regarding one or more specific fields of a particular segment 54. Thus, as a program $52_0$ is being defined through the operation of the image editor 32, any of a predefined set of program attributes may be selected by the incorporation of program based feature packets. These program based feature packets each provide a specific high level specification for a particular procedure or qualification that will be applied by the author 44 in generating the code for the program $52_0$. Program based feature packets generally are not addressed to any specific field and are generally assigned one per program segment. Table I provides an exemplary list of program based feature packets employed in a preferred embodiment of the present invention and a description of the functional specification generated by each.

TABLE I

| Program Feature Packets | |
|---|---|
| Basic Program Specification | Allows change to Type, Subtype, Read and Write Program options selected when the program was created. |
| Suppress Delete Key | Disables the F5 DELETE function key from the user access. Used to prevent deletion of records from master files. |
| Suppress Print Blank Lines | Eliminates printing a blank line when all data fields on the report are blank, optionally any background text on the line may be suppressed. |
| Output Options | Defines special program processing for 1 Screen Inquiry, 2) Screen Selector or 3) ASCII file - if chosen, option to receive output file name from user must be specified. |
| Override Page Heading | Provides for suppression of standard page heading, allowing the format of a custom heading. Generally used for forms processing. Almost always used when generating an ASCII file for export. |
| Define Next Segment | Used to change natural order of segment execution from the lowest number to the highest number. Can provide branching to a program not generated by the system (non-native) as well as native program processing. |
| Ask User for Main File Name | Prompts the user to assign the main program file to a different file on the disk. Generally used with archive/de-archive programs to allow control over file placement. |
| Add Process Halt Support | Provides for user initialed program halt on demand. |
| Destroy File on Purge | Program will delete the file specified in Segment records as the Purge output type with this option activated. Used for temporary work files which are used during a session and then deleted in entirety upon program completion. |
| Side by Side Records | Defines number of columns of records to print on report before beginning a new row. Used to create double-up or four-up labels, for example. |
| Reset Autonumber on Purge | All continuous autonumbers will be reset to 0 when records are cleared from the file during purges. |
| Suppress Posting Screen | Specifies that a posting process will be silent and not announce that it has started. |
| Don't Protect Field Math | Disallows divide by zero protection for a field; also disables field initialization as a product of a calculation. |
| Programs Pop-Up Call | Identifies Selector Pop-Up program to be called from this field, enter name or use F2 Call preceded by Topic to view list of available programs. The Pop-Up is referred to as a Selector. |

In editing a segment $54_1$, designated fields on the image page can be assigned attributes also based on feature packets. These field based feature packets are utilized to define operative logic inclusions and qualifications that are to be performed generally on a field specific basis. Each field based feature packet can reference and thereby use or affect the contents of other fields. They can also control program flow by starting or skipping other program segments. Exemplary field based feature packets as used in a preferred embodiment of the present invention are identified in Table II.

TABLE II

| Field Based Feature Packets | | |
|---|---|---|
| Feature Packet Name | Basis | Description |
| Screen Data Element Location | | Defines the local iteration of the data name. This is the "00" packet or root packet that declares that there is a data name and that it may have packets. The imaging editor automatically prompts for the root packet as part and parcel of implementing the data name in the current segment. The packet can override data dictionary definitions of the data name. For example, increase the |

TABLE II-continued

Field Based Feature Packets

| Feature Packet Name | Basis | Description |
|---|---|---|
| | | minimum allowed collection length or reduce the display length. The packet can also make the data name "not a field" part of the background screen mask, causing it to be re-displayed on a later screen with any processing to support it. |
| Element Edits | EDITS | Limits the range of entered values, sets repeat or recurring entry specifications, sets calculation relationship and establishes display maskings. |
| Element Display Logic | DISPLAY | Provides field characteristics for displayed data in the following methods - 1) Display Only, 2) Forced, 3) Default, 4) Tally Target and 5) Invisible. Logic is necessary for all options other than (4) Tally Target. Help text F7 is available to explain each of the five options. |
| Element Verify Logic | VERIFY | Identifies Reference File and Record to verify field value for data entry accuracy. Specify enforcement option and use ~!A~ for alpha or ~!#~ for numeric field (equivalent to "value of current field") to build the key value for verification of current field. Any other elements of the key should use existing data elements by their name. |
| Element Skip Logic | SKIP | Allows a field to be bypassed for data entry if the conditions specified in the Logic section are met. If checking a padded field for skip, such as the skip logic on a Display Only variable used to show the name of a field read with verify, you should use SKIP IF FIELD IS EMPTY, otherwise you must check for blanks, as well as a null condition. |
| Element Display to Logic | DISP2 | Displays a value created by the specified logic at a selectable location at the bottom of the screen. The packet causes a value to be placed elsewhere without having the benefit of any known target field. |
| Field Validation Logic | VALID | Defines allowable values for field data entry. In Logic section you must include field name if a comparative is used as it is not assumed that the field name involved belongs to the right or left of the inequality. |
| Element Calculate to Logic | CALC2 | Causes another field's value to change based on the value captured or received into the current field. The change may be any math operator and may be displayed as it is happening or wait until the other field processes. |
| Element Input Options | | Specifies optional data entry program for input. The current options are Single Character I/O to allow in-field editing and Multi I/O to allow for long text fields of multiple recurring lines. |
| Case | CASE | Causes the value (in any type of string field) to have its case forced. The options are change to all UPPERCASE, change to Capitalized first word, Change to Capitalized First Letter or change to all lower case. The packet can act on any data name anywhere in the program segment (many packets can cause changes in fields which are not displayed in the image, not on the screen or report). |
| Element Skip Field if Empty | SKIPEM | Allows a field to be bypassed for data entry if another field contains a null value (blanks) for string variables or zero for numerics. |
| Input Edit Options | INPUT | Allows for the entry of a user-specified range of valid characters for an alpha field. Options are limited numbers, numbers and alpha, alpha only, Y or N or a specific list of characters. |
| Copy Value to Field | COPY2 | Target field is identified to receive contents of the source field. This is equivalent to a Move in programming. |

TABLE II-continued

Field Based Feature Packets

| Feature Packet Name | Basis | Description |
| --- | --- | --- |
| Translate to a Field | TRANS | Specifies conversion required for 1) Encryption, 2) Decryption, 3) Soundex - used in phonetic searching for names, including Description and Program Target. |
| Element Tally (Running Total) | TALLY | Provides totaling options (=−*/) for a Display Only Field identified to receive results from this source field. |
| Don't Exit on Logic | NO EXIT | Tests for a specific value in field which allows program termination only when the logic is satisfied. Forces the user to complete requirements such as an in-balance condition before exiting. |
| Post to Another Field | POST TO | Causes a value created by the defined logic to be placed in a targeted field. |
| Post From Another Field | PSTREL | Causes the value created by logic to be placed in the current field to which the packet is anchored. |
| Field Default | NEWVAL | Specifies a default field value to be placed in the field either when empty or used to replace the current field contents. This Feature Packet is always used in conjunction with the One-to-Many posting relationship discussed as a full function later in this guide. |
| Convert Date Into String Name | CONVDT | Translates a date field, which stores the date as a Julian number, into a string field which can be the day of the week or the month of the year. This feature is used extensively in scheduling. |
| Convert Numeric Amount to Alpha | CONV2A | Used to make a worded dollar amount for printing on checks. |
| Report Default Totalling | RTOTAL | Requires numeric field validation prior to using field in a report subtotal or grand total. For numerics, operator (+−/*). |
| Calculate to Subtotal | | Requires numeric field validation prior to using field in a report subtotal. Same scheme as Report Default Totaling. The subtotal region must exist and contain the target variable. |
| Calculate to Grand Total | | Specifies numeric file validation prior to using field in a report region must exist and contain the target variable. |
| Specified Range Inclusive Start | START | Specifies Data name from Start-Up screen used to verify beginning range of field value for inclusion in report. |
| Specified Range Inclusive End | END | Specifies Data name from Start-Up screen used to verify ending range of field value for inclusion in report. |
| Specified Exclude on Exact Match | MATCH | Compares field value with value entered here to exclude a record from the report. |
| Yes or No Logic | YES/NO | Compares field value to logic to determine if field should be included. Only works when combined with Exclude on Yes or No Option. |
| Normal Exclude Record Logic | NORMAL | Defines conditions to be met to exclude a record from report. Field does not have to be present on report, and packet may be used to anchor exclusion to another field which does appear on report. |
| Define Sort Key | SORT | All sort options created in the Start-Up screen must be defined and anchored to fields used on the report. The sort option should be located on the lowest field order of the sort. |
| Data Name Incrementor | MEMINC | Causes the value in the anchor field to be changed by a fixed amount each time (usually each record processed) the counting is self-contained, it starts at the same value, counts in memory and then clears. |
| Normal Include Record Logic | NORMIN | Causes records being processed to be included or ignored based on values at the time. The packet is commonly used in processes and output. |
| Skip Program Segment on | SKPPRG | Completely eliminates execution of this |

TABLE II-continued

Field Based Feature Packets

| Feature Packet Name | Basis | Description |
|---|---|---|
| Logic | | segment based upon logic condition passing. The logic must be loaded into a non-stored data name in an earlier segment. No records will be read. |
| Hide Output Detail | HIDE | Provides print suppression for record based upon logic successfully completed. Information from the record can be used in the program to accumulate totals without printing the detail records. |
| Change Sign on Logic | SIGN | Changes the sign of a numeric variable based upon passing the logic specified. |
| Grand Total | | Specifies that the field to which the packet is anchored should have grand total, subtotal or both created for it even though there are no specifications on how to create subtotals or grand totals defined for the report/process. The packet supports the definition of sums, negative sums, progressions and negative progressions. |
| Debit Logic | | |
| Grand Total to Credit Logic | | The same operation as Tally To Credit Logic except it is intended to be used to update specifically defined grand total region's fields. |
| Tally to Debit Logic | TALLY | The same operation as Effect Other Field but only subtracts field contents from variable specified under passing conditions of logic entered. |
| Tally to Credit Logic | TALLY | The same operation as Effect Other Field but only adds field contents to variable specified under passing condition of logic entered. |
| Automatic Incrementor | AUTOIN | (also known as autonumber) Specifies one of two types of automatically incremented fields. The first type continuously numbers the file within the specified range, one increment each iteration. The last incremented value is stored on disk and the incrementing continues next time. The second type counts lines based on a referenced header record. Each header gets its own increments and the values can continue from session to session. |
| Fields Pop-up Call | POPUP | Identifies Selector Pop-Up program to be called from this field, enter name or use F2 Call preceded by Topic to view list of available programs. The Pop-Up is referred to as a Selector. |
| Verify By-pass Logic | | Makes all of the various verify features conditional based on the defined logic. |
| Element Verify Denial Logic | DENIAL | Is a negative verify. Specifies that a referenced record should NOT be there to pass. Both the feature and the basis are spelled right in the system. |
| Verify Only | VONLY | Same as Element Verify Logic but the read to the referenced file/record is only for the purpose of verification, no data should be changed or loaded. |
| Write Record | WRITE | Is an inverted verify. Instead of reading the referenced record, write the referenced record. |
| Verify Approximately | APXVER | Is a full verify to (another) referenced file/record that will load data (the full referenced record), but the key value to the (other) referenced file/record is not completely known. This packet will cause the authored program to be able to do table scans as part or a simple reference read, allowing inexact related data to be matched up during processing. |
| Verify Load Table | LOAD | Is a complete verify including reading the entire (other) referenced record, but the record will be treated as nonvolatile data during the program's execution. |

TABLE II-continued

Field Based Feature Packets

| Feature Packet Name | Basis | Description |
| --- | --- | --- |
| Update From | | Specifies the field or collection of fields that will contain the value to place in the current field. |
| Post Program Completion Action | | Override the Author's default termination scheme for posting programs; options for alternate termination logic provided. |

The image editor 32 preferably provides a picklist for the selection of both program and field based feature packets. As a feature is selected based on user input 14, additional information is presented for user input completion. This additional information is presented typically in the form of a pop-up display record that prompts for user input to sufficiently qualify the desired function of the selected feature packet.

The feature packet identification and supporting information are collected by the image editor as enumerated attributes of a particular program 52, or segment $54_1$. Preferably the image editor 32 further operates to reasonably validate these attributes against the existing application structure including specifically file and record 56, 58 references. Feature packets that further define basis attributes are also validated against a rule table 62 that includes a record for each basis. Each basis record defines the abstract behavioral characteristics that define a particular basis. The behavioral characteristics, when combined with the qualifying information entered by the user with respect to a specific instance of a feature packet, permit the definition of a set of application sequences that can be utilized to implement the functionality of the feature packet.

The feature packets may and generally do provide for the user input entry of functional logic to complete the definition of a particular feature packet. For example, the Tally To feature packet supports the specification of another field name and the specification of an arithmetic operator. For example, the realized feature packet can be represented as:

```
16AP200100Total Cost
0
+
Value Tally
0
```
where:
| 16 | ID of rule corresponding to this packet |
| --- | --- |
| AP | Topic identifier |
| 2001 | Program identifier |
| 00 | Program Segment identifier |
| Total Cost | Field identifier where feature packet is anchored |
| 0 | Reserved for future use |
| + | First feature value |
| Value Tally | Second feature value - destination fields. |
| 0 | Third feature value |

Thus, the functional logic of such feature packets is largely implicit, with the user providing and being exposed to minimal requirement specifications. In support of this functional logic, a number of system variables are provided for reference. These system variables are not conventional variables, but rather abstract elements to the system functions, calls, and literals, as well as reserved or pre-defined variables and user defined variables. System functions include obtaining the system date (!Data Date), while calls may call for system operations such as generating an audible tone (!Data Ring Bell), literals include fixed data strings (!Lit Asterisk) and data constants. Reserved variables include functional programming constraints (!Ele LP Counter), arithmetic functions (!Ele Calc 2 Field), pre-allocated variables (!Data Temp Num 1), and functional system status (!Curr Topic; !Data Main Read). Finally, user defined system variables include all of the field names defined by the user through the image editor, thereby allowing direct consistent reference to custom as well as pre-defined aspects of an application program and its dynamic execution environment.

The functional logic may include conventional, numeric and logical operators that serve as relational connectors between combinations of system variables, field names, file names, and record names, as well as information in the application structure, provided by the sequences, and dynamic execution memory variables and literals. The field names are the names associated with fields as part of the definition process implemented by the imaging editor 32. The file and record names correspond to the file and record ID's specified in the definition of the files and records 56, 58 of the application structure 36. Exemplary system variables are detailed in Table III.

TABLE III

System Variables

| | |
| --- | --- |
| !# | Current Numeric Field Variable |
| !a | Current String Field Variable |
| !Curr Basis Key | Current Pointer Into Sequence |
| !Curr Error | Current Error Number |
| !Curr Field | In Process Field Name |
| !Curr Field Max | Number of Fields in Segment |
| !Curr Field Rec | Current Fields Record |
| !Curr New Line | Fully Substituted Text Line |
| !Curr Next Seg | Programs Next Segment Number |
| !Curr Page No. | Current Audit Page Number |
| !Curr Program | Current Program ID |
| !Curr Segment | Current Segment ID |
| !Curr Topic | Current Topic ID |
| !Curr Variable | Current Variable In Translation |
| !Data Bell Sound | Sound Bell with Message |
| !Data Date | Run Time System Date |
| !Data DSZ | Remaining Data Size Variable |
| !Data End Check | End of Data Variable |
| !Data Input | Run Time Input Variable |
| !Data Main Read | Main File Read Succeeded |
| !Data Menu SW1-14 | Menu Parameter Switches 1–14 |
| !Data Next Prog | Run Time Set Next Program |
| !Data Page Count | Report Page Counter |
| !Data Read Write | Buffer Read/Write Flag |
| !Data Required | Required Record Yes/No Flags |
| !Data Row | Temporary Variable for Row Number |
| !Data Search | Search Key |
| !Data Temp Num 0–7 | Run Time Temporary Numeric Storage |
| !Data Temp Str 0–7 | Run Time Temp String Variable |

TABLE III-continued

System Variables

| | |
|---|---|
| !Data Total Base | Numeric Total Array |
| !Data VDP User | Run Time WorkStation and User |
| !DDICT Case CVT | Case Conversion Option |
| !DDICT Data Type | Data Type |
| !DDICT Desc | Description of Entry |
| !DDICT Justify | Field Justification |
| !DDICT Max Len | Maximum Length |
| !DDICT Min Len | Minimum Length |
| !Ele Calc Dest | Calculated from Screen Math |
| !Ele Calc Source | Source for Screen Math |
| !Ele Calc2 Field | Target Field of Calculation |
| !Ele Calc2 Op | Calculate to Math Operation |
| !Ele Calc2 Show | Display Calculated Field |
| !Ele Col | Element Column |
| !Ele Conv From | Source Field for Conversion |
| !Ele Conv2 Alpha | Target Field for Numeric to Alpha Conversion |
| !Ele Conv1 Field | Target Field After Conversion |
| !Ele Convto Mask | Use Mask Number to String Convert |
| !Ele Copyto Field | Field Name to be Copied To |
| !Ele Copyto Type | Record Type of Copy To |
| !Ele Disp Logic | Element Display Logic |
| !Ele Disp Option | Element Display Option |
| !Ele Dispto Pos | Element Display to Position |
| !Ele Dispto Type | Record Type of Display to |
| !Ele Dispto Logic | Element Display to Logic |
| !Ele Exitlogic | Don't Exit Logic |
| !Ele Exit Option | Don't Exit Option |
| !Ele Grand Field | Grand Total Calculate to Field |
| !Ele Grand Sign | Mathematical Operator |
| !Ele Grand Plus Field | Grand Total Add to Field |
| !Ele Grand Plus Logic | Grand Total Add to Logic |
| !Ele Grand Minus Field | Grand Total Subtract to Field |
| !Ele Grand Minus Logic | Grand Total Subtract to Logic |
| !Ele Imm Field | Immediate Update Target Field |
| !Ele Imm File | Immediate Update File |
| !Ele Imm Op | Immediate Update Operation |
| !Ele Increment | Numeric Display Increment |
| !Ele Input From1 | From Value Range one |
| !Ele Input From2 | From Value Range 2 |
| !Ele Input From3 | From Value Range 3 |
| !Ele Input Thru1 | Through Value-Range 1 |
| !Ele Input Thru2 | Through Value-Range 2 |
| !Ele Input Thru3 | Through Value-Range 3 |
| !Ele Loop Use | Loop Start or End Flag |
| !Ele Lp Counter | Loop Counter Variable |
| !Ele Lp Exac tEn | Exact Ending Loop Number |
| !Ele Lp Exact St | Exact Starting Loop Number |
| !Ele Lp Var En | Variable Ending Loop Number |
| !Ele Lp Var St | Variable Starting Loop Number |
| !Ele Tally Clear | Running Total Clear Option |
| !Ele Tally Field | Target Field for Running |
| !Ele Tally Op | Running Total Math Operation |
| !Ele Tally Plus Field | Tally to Add to Field |
| !Ele Tally Plus Logic | Tally to Add to Logic |
| !Ele Tally Minus Field | Tally to Subtract from Field |
| !Ele Tally Minus Logic | Tally to Subtract from Logic |
| !Ele Type | Field Type |
| !Ele Up To Logic | Post to Update Logic |
| !Ele Up To Option | Post to Option |
| !Ele Up To Target | Post to Target Variable |
| !Ele Up X18 Func | Update with Translation Function Name |
| !Ele Up X18 Logic | Source Field to Translate From |
| !Ele Up X18 Prog | Translation Program Name |
| !Pgm Subtype | Program subtype |
| !Pspec Ask | Ask for Main Data File Name? |
| !Pspec Ask Prompt | Prompt Text to get Main File |
| !Pspec Alt File | Reports Output Data File Name |
| !Pspec Alt Text | Reports Output File Prompt |
| !Pspec Output | Report Output Option |

The system variables thus provide an easy mechanism allowing for the testing of current state, the manipulation and conversion or translation of data between records and fields and between sets of fields, for the establishment of option sets, and in specifying logic function operations for particular fields or actions to be taken entering or exiting fields. While the system variables are available for reference in feature packets, they are more commonly used in or referenced by the program and test rules implemented in the knowledge base 34. Most of the system variables affect or detail lower level functions relative to the functional specifications established in relation to feature packets. For example, a mere field name reference in a feature packet that supports editing of the displayed value will be implicitly evaluated subject to the program and test rules to determine if an initial default value is to be displayed in the field. The test rules that will determine if a default value is to be displayed and the program rules that will determine or fetch the default value can reference the system variables extensively in implementing the necessary functional logic. If a field is to be defaulted to the current date, but permitted to be user modifiable, then the rules may retrieve the current date (!Data Date) and place the date in the field (!Display To) if the current field (!a) is empty. Consequently, a direct and highly non-procedural capability is provided by the use of the system variables within function packets, while providing a detailed yet highly abstracted capability in support of the formation of program and test rules.

Finally, the various definitions generated by the image editor are provided preferably as each definition is completed to the sequence generator 66. The definitions are evaluated by the sequence generator 66 to generate sets of application sequences. The definition evaluation is preferably performed by an expert system underlying the sequence generator 66. As feature packets and functional logic are evaluated by this expert system, reference is made to a control table 64 that, in combination with rule table 62, operates as an abstract, multi-level data look-up facility utilized in support of generating definite application sequences. The control table identifies sets of rule table entries while the rule table provides the abstracted behavioral characteristics for each basis referenced in the feature packets. A simple basis may have a single rule table entry that is properly used in all instances where the basis may appear. A more complex basis, or function, defined as a basis that may be subject to some ambiguity in its intended use, may be first evaluated against the control table to determine a particular set of basis rules to consider in further evaluating the complex basis or function. Thus, for example, a function reference to a field name in the context of a data input process may imply the need for establishing the input focus transversal of the field relative to others. However, the same function in the context of a report process would imply a significantly different functionality, particularly one related to the optimum retrieval order of data for this and related fields. Functions, representing complex basis, are referenced through the control table 64. These functions are summarized in Table IV.

TABLE IV

Control Table Functions

| | |
|---|---|
| ALT KEY | Defines how program elements are to be selected by an alternate index key reference in different contexts. |
| AUTONUMBER | Defines how ordered program elements are to be sequenced in different contexts. |
| ELEMENT | Defines the process for creating a program element in different contexts. |
| ENTRY | Defines traversal order for fields in different contexts. |
| LOCATION | Determines how the location of a field or program element is to be determined in different contexts. |

TABLE IV-continued

Control Table Functions

| | |
|---|---|
| MAIN KEY | Defines how program elements are to be selected by the main index key reference in different contexts. |
| ORDER | Determines the method of defining the order of program records or elements in different contexts. |
| RECORD TYPE | Determines the type of a program record in different contexts. |
| UIP FIELDS | Determines the set of additional fields or program elements that must be defined in support of the further rule processing of a program segment in different contexts. |

For example, the ELEMENT function, in the context of a data capture program, will, in turn, reference the following functions or simple basis:

ELELOC Element location on the image page;
ENTRY The order in which data fields collect data;
NAME Element of field name;
PTRANS Translation sequence for the field name; and
RECORD Add to the database.

However, in the context of a posting process, the ELEMENT function will reference only ELELOC, NAME, PTRANS, and RECORD.

Figure 5:
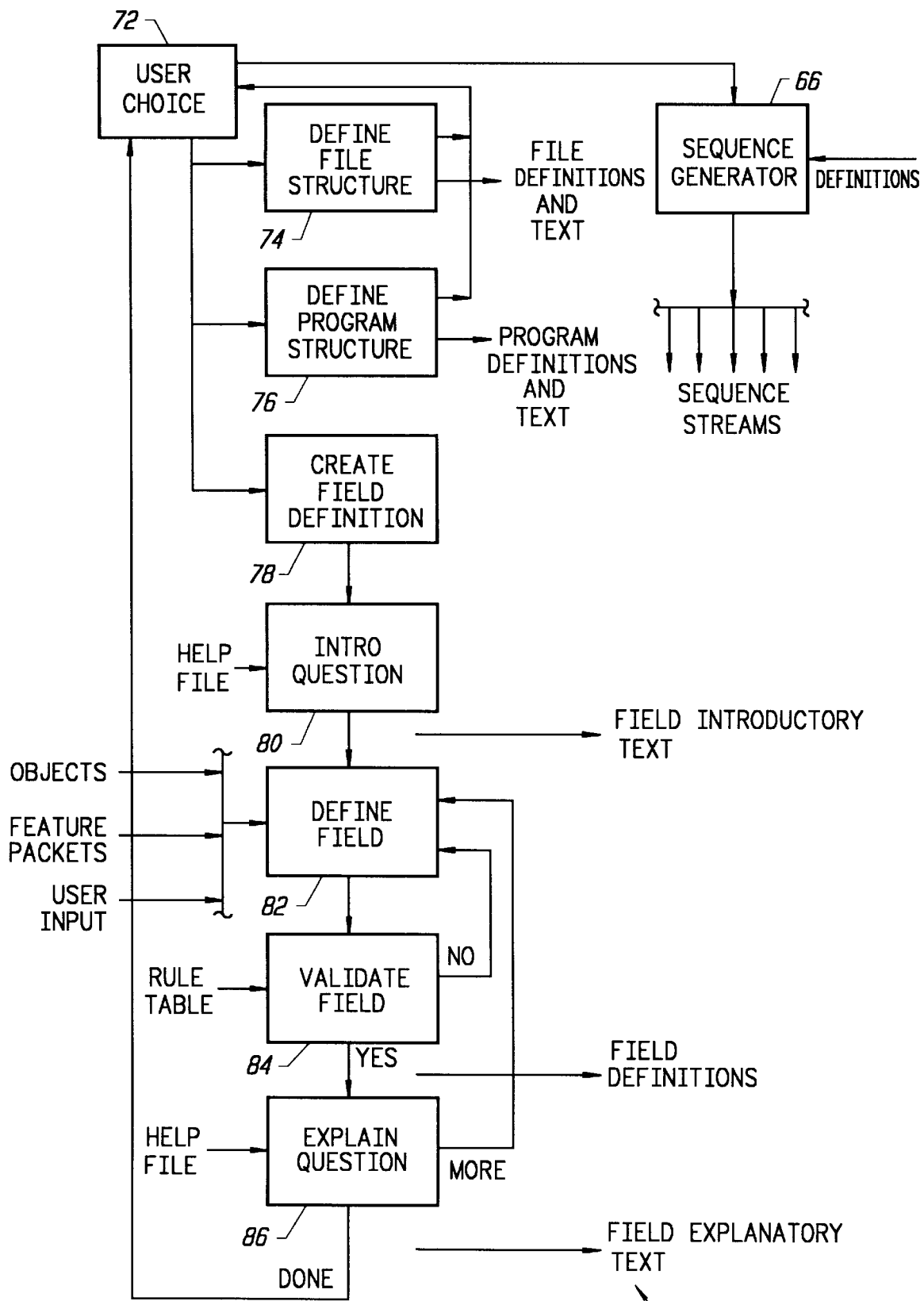
FIG. 5 provides a diagram detailing the operation of the imaging editor sub-system.

FIG. 5 illustrates the process implemented by the image editor 32 in creating the various definitions and text that are provided to the sequence generator 66. The process 70 begins with the election of a user choice 72 to define the file structure 74, define a program structure 76, or create a field definition 78. With each of these choices, the user is prompted, and provided with starting text as appropriate, through a process that results in the production of definitions and text representing the user's further inputs. In the case of defining a file structure 74, file definitions and text are produced. The file definitions are utilized to logically establish the file and record 56, 58 entries in the application structure 36. Prompt responsive text entered with respect to each of file and record 56, 58 is also captured by the define file structure step 74. This text is stored to the help file 40. The process 70 then resumes with another user choice 72.

The define program structure step 76 similarly results in the creation of program definitions and text. The program definitions are utilized to logically define the program and segment records 52, 54 of the application structure 36. The prompt responsive text is stored in the help file 40.

The file and program definitions created by the steps 74, 76, including the applicable record and are effectively made immediately available to the sequence generator 66. That is, with each iteration of the operation of sequence generator 66, the application structure 36 is available to the sequence generator 66 for reference.

The create field definition step 78 and succeeding steps 80, 82, 84, 86 together detail the flow of creating field definitions and text. This process is generally exemplary of the define file structure 74 and define program structure 76 steps described above. The process of defining a field begins with the choice of the create field definition 78 by user choice 72. A predefined prompting question and any applicable starting text is obtained from the question file associated with the help file 40 and presented to the user for response. This introductory question step 80 is utilized to obtain an introductory statement as to the purpose and function of the field being defined. This field introductory text is stored back to the help file 40. A define field step 82 permits the user by input to select the appearance of the field being defined. This may include the selection of an object from the object store 42. The attributes of any fields within an object retrieved during the define field step 82 are maintained initially, subject to further modification by user input. Specifically, feature packets associated with a field within an object may be opened and edited during the define field step 82. Feature packets associated with an object can also be added or removed. Thus, an object, once retrieved in a define field step 82, preferably ceases from being distinguished as an encapsulated object. Each field and attribute defined through the retrieval of an object is functionally no different from a field or attribute newly defined through user input.

When the user input indicates that the definition of a particular field is complete, at least temporarily, the imaging editor 34 transitions to the validate field step 84. The rule table is consulted in real time in combination with the application structure 36 to ensure that proper feature packet basis and functional logic have been defined for each attribute associated with the defined field. If the validation of the field fails, the imaging editor 32 returns to a define field step 82 to permit user directed correction. Failures that are subject to unambiguous correction may be automatically corrected by the imaging editor 32. When a field is finally validated, corresponding field definitions are produced by the imaging editor 32. These field definitions serve to identify all aspects of the field and assigned attributes. Although these field definitions are preferably immediately provided to the sequence generator 66 for processing, an image is maintained by the image editor 32 in support of further editing of the defined fields.

Once a field has been validated, an explain question step 86 is performed to obtain detailed explanatory text regarding the purpose and function of the defined field. A prompting question and, again, any applicable starting text selected based on the currently chosen attributes of the defined field is presented to the user. Prompt responsive text provided by user input is stored in the help file 40 as field explanatory text.

Where multiple fields are to be defined relating to a specific function, such as category and sub-category fields used to identify an inventory item, the image editor 32 returns to the define field process step 82 to define a next field. Once the set of one or more fields are fully defined, the image editor returns to the user choice step 72.

Figure 6:
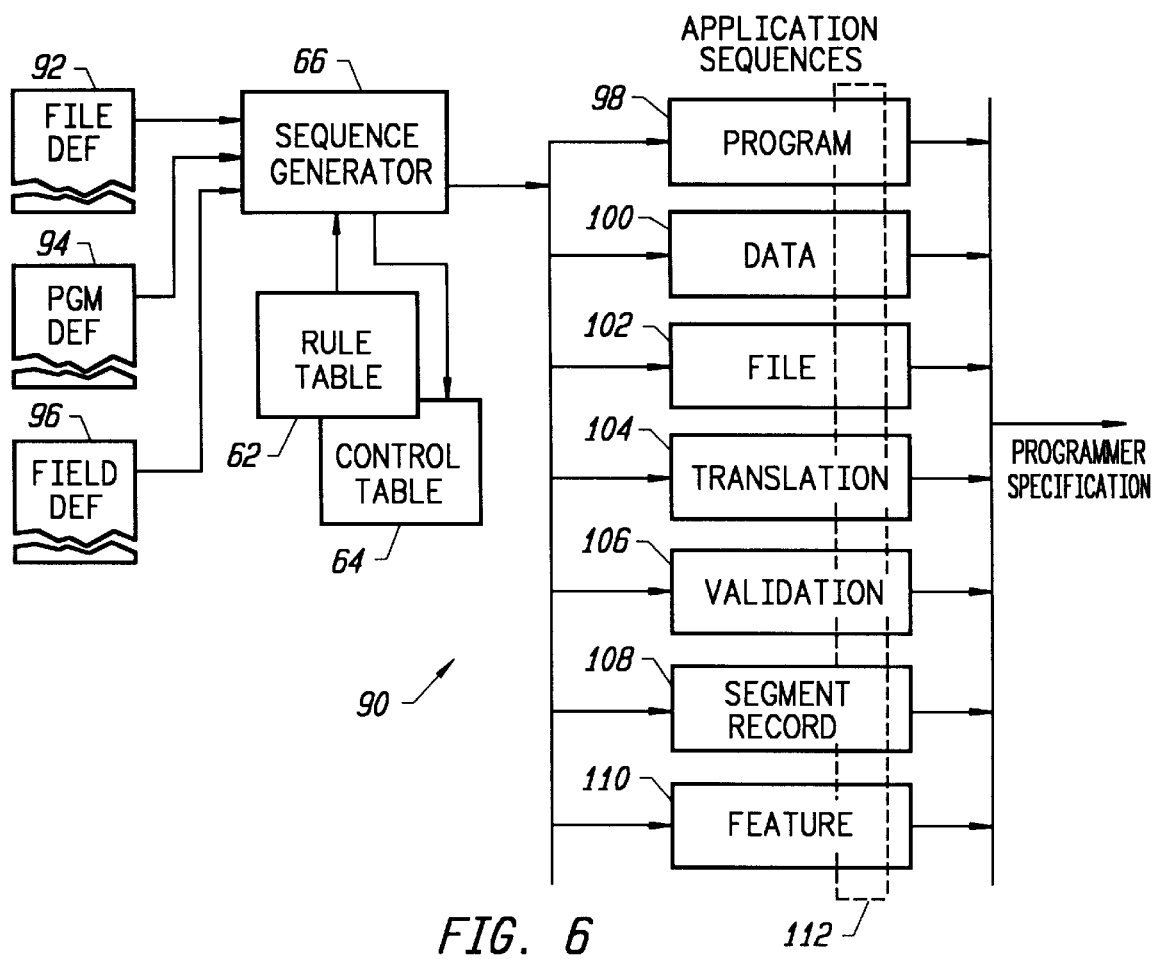
FIG. 6 provides a diagram detailing the operation of the sequence generator in establishing the parallel application sequences.

Referring now to FIG. 6, a detail 90 of the sequence generator 66 and application sequences produced by the sequence generator 66 are show. As previously established, the sequence generator 66 operates from the application structure 36, presented as file definitions 92 and program definitions 94, and the field definitions 96 produced by the image editor 32. These definitional inputs are processed by the expert system of the sequence generator 66 directly or indirectly through reliance on the control table 64 to identify and select behavioral characteristics of a specific basis from the rule table 62 as identified by attributes of the field definitions 96. In the preferred embodiment of the present invention, the sequence generator 66 operates to generate discrete sequences that are functionally descriptive of particular aspects of the input definitions. Specifically, program sequences 98 are generated to define the apparent ordered execution of the process represented by a particular segment 54. For example, program sequences will define the order that screen display fields are visited. Program sequences will also implicitly define the order of retrieving, editing, and saving record data.

Data sequences 100 are discretely generated to describe ordered data relationships between various records 58. For example, data sequences will define the files and records 56, 58 and the key fields that are to be used to retrieve or store data to those or other files and records 56, 58.

File sequences 102 are generated to provide relation references between program and data sequences 98, 100. For example, a file sequence may provide a logical connection between a field identified as part of a logical functional statement of a feature packet that is realized as an ordered set of program sequences and a data sequence 100 that references a particular record 58. A file sequence 102 is utilized to specify the transfer of data referenced by the data sequence 100 to a field referenced by a program sequence 98.

Translation sequences 104 are generated to support the ultimate association of particular data names with abstracted variable names that are either implicitly allocated on a dynamic basis through the operation of the sequence generator 66 or represent system variables. Thus, data identified by a data sequence 100 and retrieved as specified by a file sequence 102 will be instantiated ultimately in a program variable established by the author 44 based on a translation sequence 104.

Validation sequences 106 provides discrete sequences that represent conditional qualifications that may be applied in reference to other sequences. In particular, validation sequences are utilized to embed functional logic conditions applicable to particular data fields or groups of data fields.

Segment record sequences 108 provide a list of the record identifiers of the records 58 that may be involved in a data read or write, test for existence of a specific record, a purge or clear of a particular record, and any records that are to be used as a source or target or involved in a header/detail relationship with a record that is to be read or written during a current segment 54.

Feature sequences 110 provide for sequences that describe functional logic that is to be applied to a field or group of fields and may involve references to system variables of all types. Although each feature sequence is now preferably complete in specifying a particular functional logic function, such as tallying a particular field to another with a specific arithmetic or boolean operator, more generalized functions can be implemented through the use of multiple sequences to represent a single feature packet.

The application sequence structures 98, 100, 102, 104, 106, 108, 110 are not ordered strictly as first-in first-out ("FIFO") sequence buffers. Although sequences may be added to the structures in a generally parallel FIFO order, each of the application sequences are added in a frame by frame relationship that relates zero or more sequences in the sequence structures 98, 100, 102, 104, 106, 108, 110 in a virtual frame such as the frame 112. Thus, if a program sequence within the frame 112 does nothing more than assign a value to a field, a translation sequence may be the only other sequence in the frame 112. Conversely, any number of sequences in one or more of the sequence structures 98, 100, 102, 104, 106, 108, 110 may be related by a particular frame 112. Consequently, each frame 112 of the application sequences fully defines a very narrow logical relationship that may be ultimately realized in the execution of the code generated by the application generator 30.

Although the application sequences are related to one another as frames 112, the individual sequences may be added to the application sequence structures 98, 100, 102, 104, 106, 108, 110 on an as generated basis. The functional partition of the sequences into discrete sequence types results in sequence relationships being implicitly defined by frame reference.

In a preferred embodiment of the present invention, the application sequences are simple data records each with a small number of sequence fields. Each of the different types of sequences 98, 100, 102, 104, 106, 108, 110 have a unique, predefined set of sequence fields. In general, all of the sequences include a sequence field identifying a corresponding segment 54 and directly or indirectly a frame identification field. However, some sequences 98, 100, 102, 104, 106, 108, 110 may be generic to a file 56, program 52 or even a topic 50. These generic sequences are considered part of the sequence sets of art all hierarchically depending segments 54 and records 58. Sequence type specific fields include function fields for specifying a program sequence function, such as verify vendor, and more generalized sequence fields, such as counters, for specifying the order of sequences related to a particular frame or sequence.

Figure 7:
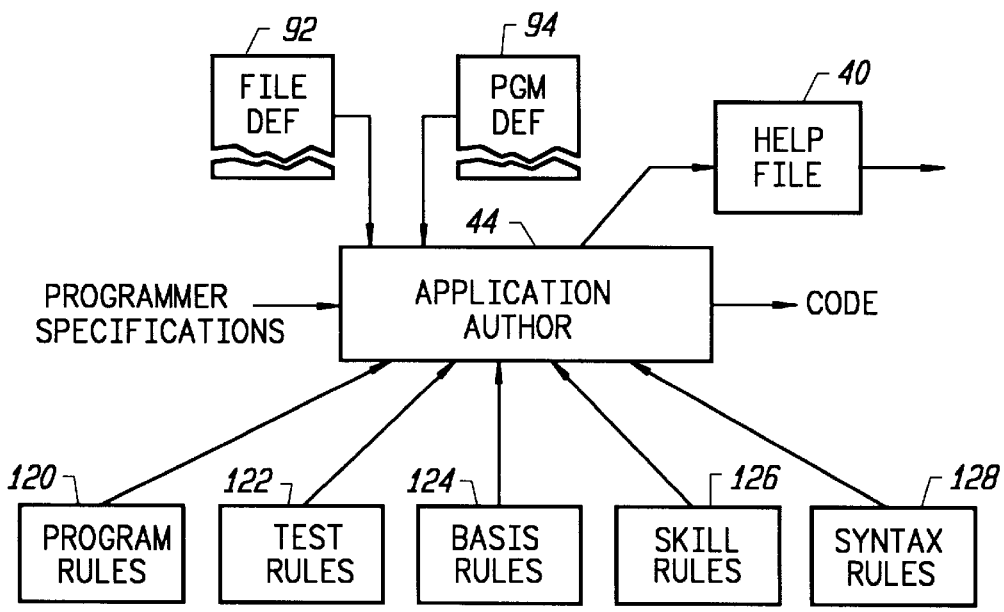
FIG. 7 provides a diagram detailing the application author expert sub-system constructed in accordance with the present invention.

Frames 112 of the application sequences are generally sequentially evaluated by the expert system underlying the application author 44. As indicated in FIG. 7, programmer specifications, representing the collected application sequences are received as an input to the application author in combination with the application structure 36 as represented by the file definitions 92 and program definitions 94. In addition, the application author 44 has access to the knowledge base 34 for retrieval of program rules 120, test rules 122, basis rules 124, skill rules 126, and syntax rules 128. Based on the program type and sub-type obtained effectively from the program definition 94, the applicable set of program rules 120 and corresponding test rules 122 are selected for evaluation by the author 44 against the programmer specifications. These selected program rules anticipate and impose a general framework to the functions and relationships presented by the programmer specifications. As a consequence, the program rules 120 serve to select out of the programmer specifications the information from the available application sequences needed to satisfy the program rules 120. The test rules 122 serve as high level qualifications tests to determine whether different subsets of the program rules 120 are to be utilized in view of the particular programmer specifications being supplied to the application author 44. Consequently, the comprehensive structure and flow of a particular code module generated by the application author 44 is inferentially dependant on the fields and field relationships initially established based on user input.

The basis rules 124 are evaluated in concert with individual program rules and specific frames of application sequences to instantiate the previously abstracted behavioral characteristics of feature packets as represented by the programmer specifications.

The skill rules 126 are applied by the application author 44 to develop the intermediate representation of the code being produced by the application author as a consequence of the evaluation of the program and basis rules 120, 124. The skill rules 126 also participate in the evaluation of the syntax rules 128 against the intermediate representation of the code to ultimately realize the instantiation of individual code statements.

Finally, the application author 44 also produces textual information relating to the fields, programs and menus that will be realized through the execution of the code. This additional information typically includes field sizes and types, included programs, and menu organizations, as well as context specific directions on the manner of operating at a screen prompt, the available program options at different points of execution, actions that are specifically disallowed at a point of execution, for example. This information is stored in the help file 40 by the author 44 to augment the information previously stored there.

Figure 8:
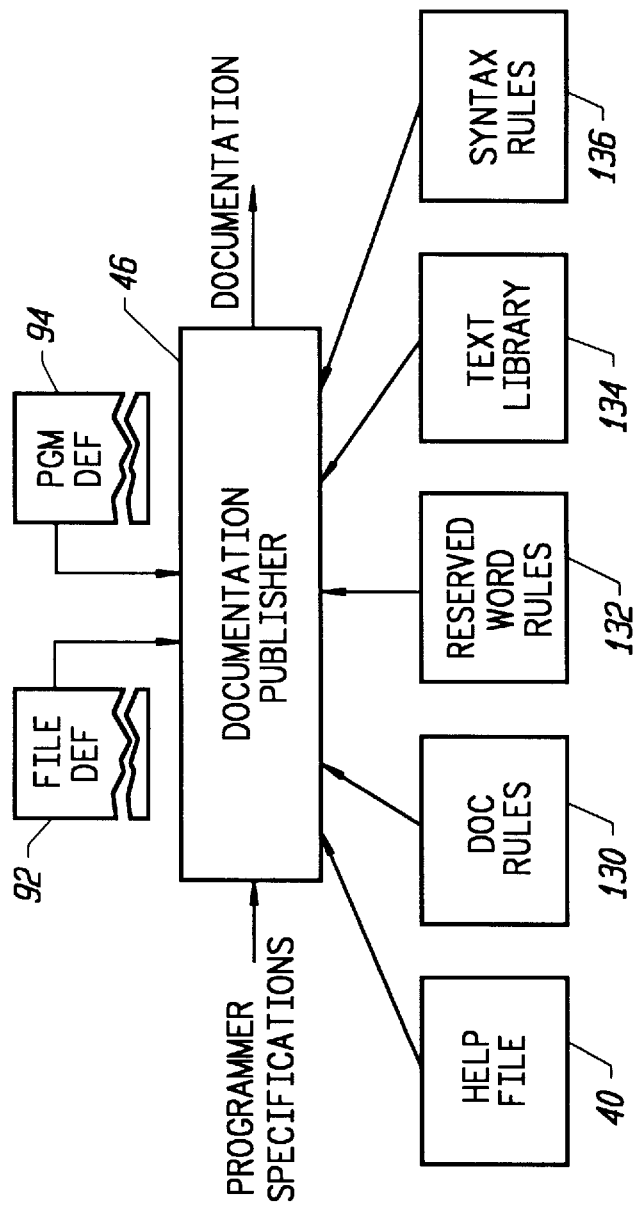
FIG. 8 provides a diagram detailing the preferred construction of the documentation publisher expert system constructed in accordance with the present invention.

Referring now to FIG. 8, the documentation publisher 46 operates generally in parallel with the application author 44, though with the notable distinction of the dependency upon the help file 40 as being prior augmented by the author 44. The publisher 46 depends on the application structure 36 as provided by the file definitions 92 and program definitions 94, which include the segment and record definitions, as well as the programmer specifications provided from the sequence generator 66. Specifically, the document publisher 46 implements a relatively simple expert system that evaluates document rules 130, obtained from the knowledge base 34, primarily against the information provided by the help file 40. The document rules 130 serve to guide the construction of the documentation from the help file information based generally on the application structure 36. In particular, the menu lists associated with the current topic of the program definitions 94 is utilized to organize the body of the documentation. The programmer specifications are evaluated, again generally on a frame by frame basis, to construct screen and report format representations suitable as illustrations within the documentation. Key words, such as function key names and basis types that occur in the help file 40 are used to trigger the evaluation of reserved word rules 132. These reserved word rules 132 are provided preferably to support expanded explanations of key concepts, operational features, or methods of use in a non-repetitive manner. Reserved word rules 132 may also support key word indexing and creation of glossary entries for key words.

The text library 134 is provided to support the publisher 46 in evaluation of the documentation and reserved word rules 130, 132. The text library provides predefined text sections, including section titles, screen introductions, appendix titles, legal notices and standard instructions. The text library 134 may also include a variety of small, less specialized text strings that can be manipulated upon evaluation of the syntax rules 136. In particular, the help file 40 and programmer specifications will provide for the identification of various fields and user visible attributes, such as display only, numeric or text only entry or the source of a default field value. The syntax rules 136 are evaluated to manipulate this information into a standard form of presentation appropriate for inclusion in the documentation in reference to the corresponding image. Consequently, a highly detailed set of documentation is produced by the publisher 46 in direct correspondence to the exact screen displays processes and reports that are implemented by the specific code generated by the application author 44.

Thus, a complete application generator system and method, providing direct support for the design, implementation, maintenance and documentation of essentially custom application programs has been described. The system requires a minimum amount of information to be input by a user in order to specify the functionality of the resulting application program. The information input is largely constrained to the definition of the application structure and logical attributes of fields that specify the characteristics of field and the relationships between fields that inferentially define the functions necessary to carry out the realization of the attribute defined functions and relationships. From these attributes and the application structure, an over-specification of application sequences is created that fully describe the inferred detailed relationships and qualifications of the attributes defined by user input. This over-specification is then reduced by an expert system that selects and utilizes needed and applicable portions of the application sequences to realize the control logic necessary to construct an application program consistent with the program types specified as part of the application structure. A complete application program is thereby constructed through reduction by syntax rules to a specific programming language. A parallel reduction of the prompted and automatically collected textual information also provides for the generation of application program documentation highly correlated to the specific application produced.

Various modifications and alternate implementations of the present invention are contemplated and may be readily resorted to by those of skill in the art without departing from the nature and scope of the present invention. In particular, many different implementations of the expert systems described above may be utilized in any particular embodiment. Direct rule parsing engines as well as backward chaining inference engines may be readily utilized in realizing the expert systems of the present invention. In addition, the expert systems of the author and publisher may be implemented as a single expert system or chained sequentially to provide for the production of code and documentation. Accordingly, the present invention may be practiced otherwise than as described above though within the scope of the present invention particularly as defined by the appended claims.

I claim:

1. A programmed system executed on a computer providing for the automatic generation of an application program, said programmed system comprising:

a) a guided image editor for establishing program, data and field definitions from a plurality of input event elements;

b) a sequence generator, coupled to said guided image editor for autonomously processing said program, data and field definitions into a plurality of functionally descriptive atomic sequences, each of said functionally descriptive atomic sequences describing a unique characteristic such that a plurality of frames, each comprising zero or one functionally descriptive atomic sequence from each of said functionally descriptive atomic sequences, respectfully describes said plurality of input event elements; and c) a rule processor including a program rule base conditionally describing the structure and operation of a predetermined application program, said rule processor autonomously processing said program rule base in concert with said plurality of functionally descriptive atomic sequences proceeding generally sequentially over said plurality of frames conditionally unifying said plurality of functionally descriptive atomic sequences with the structure and operation of said predetermined application program.

2. The programmed system of claim 1 further comprising a syntax processor including a syntax rule base defining the syntax of a predetermined programming language, said syntax processor autonomously unifying said plurality of functionally descriptive atomic sequences, as unified with the structure and operation of said predetermined application program as received from said rule processor, with the syntax of said predetermined programming language to provide a coded representation of the structure and operation of said predetermined application program consistent with the syntax of said predetermined programming language.

3. The programmed system of claim 2 wherein said guided image editor comprises a first module, responsive to said input event elements, for maintaining a program hierarchical data structure defining ordered tiers of named program nodes and named segment nodes, a second module, responsive to said input event elements, for maintaining a data hierarchical data structure defined ordered tiers of named file nodes and named record nodes, and a third module, responsive to said input event elements, for maintaining a field data structure defining ordered screen data, including named fields, and operational attributes.

4. The programmed system of claim 3 wherein:

a) said third module of said guided image editor further comprises a text submodule for providing to a screen context sensitive prompting text in anticipation of predetermined input event elements and for receiving descriptive text describing said predetermined input event elements, said text submodule providing for the ordered storage of said descriptive text in a help file; and b) said rule processor includes a documentation rule base conditionally describing the structure and organization of a document describing said predetermined application program, said rule processor autonomously processing said documentation rule base in concert with said plurality of functionally descriptive atomic sequences conditionally unifying said descriptive text with the structure and organization of said document.

5. The programmed system of claim 1 wherein said guided image editor objectifies a series or grouping of one or more said plurality of input event elements into a plurality of objects that can be cut, copied, and stored away for future use.

6. The programmed system of claim 5 wherein said guided image editor provides for the documentation of an existence, purpose and operation of said plurality of input event elements substantially coincident with said plurality of input event elements' input.

7. The programmed system of claim 6 wherein an output of said guided image editor representing said existence, purpose and operation of said plurality of input event elements is unified with a plurality of help text to provide a plurality of highly characterizing documentation that closely follows said structure and operation of said predetermined application program.

8. A programmed system executed on a computer providing for the automatic generation of an application program, said programmed system comprising:

a) a guided image editor for establishing program, data and field definitions from a plurality of input event elements;

b) a sequence generator, coupled to said guided image editor for autonomously processing said program, data and field definitions into a plurality of functionally descriptive atomic sequences, each of said functionally descriptive atomic sequences describing a unique characteristic such that a plurality of frames, each comprising zero or one functionally descriptive atomic sequence from each of said functionally descriptive atomic sequences, respectfully describes said plurality of input event elements;

c) a rule processor including a program rule base conditionally describing the structure and operation of a predetermined application program, said rule processor autonomously processing said program rule base in concert with said plurality of functionally descriptive atomic sequences proceeding generally sequentially over said plurality of frames conditionally unifying said plurality of functionally descriptive atomic sequences with the structure and operation of said predetermined application program, and wherein said rule processor further includes a documentation rule base conditionally describing the structure and organization of a document describing said predetermined application program, said rule processor autonomously processing said documentation rule base in concert with said plurality of functionally descriptive atomic sequences conditionally unifying said descriptive text with the structure and organization of said document; and d) a syntax processor including a syntax rule base defining the syntax of a predetermined programming language, said syntax processor autonomously unifying said plurality of functionally descriptive atomic sequences, as unified with the structure and operation of said predetermined application program as received from said rule processor, with the syntax of said predetermined programming language to provide a coded representation of the structure and operation of said predetermined application program consistent with the syntax of said predetermined programming language.

9. The programmed system of claim 8 wherein said guided image editor comprises a first module, responsive to said input event elements, for maintaining a program hierarchical data structure defining ordered tiers of named program nodes and named segment nodes, a second module, responsive to said input event elements, for maintaining a data hierarchical data structure defining ordered tiers of named file nodes and named record nodes, and a third module, responsive to said input event elements, for maintaining a field data structure defining ordered screen data, including named fields, and operational attributes.

10. The programmed system of claim 9 wherein said third module of said guided image editor further comprises a text submodule for providing to a screen context sensitive prompting text in anticipation of predetermined input event elements and for receiving descriptive text describing said predetermined input event elements, said text submodule providing for the ordered storage of said descriptive text in a help file.

11. The programmed system of claim 8 wherein said rule processor autonomously processing said documentation rule base in concert with said plurality of functionally descriptive atomic sequences conditionally unifying said descriptive text with the structure and organization of said document to provide a highly detailed set of documentation in direct correspondence with a plurality of screen display processes and reports.

* * * * *